March 27, 1934.　　　J. P. TARBOX　　　1,952,474

PROCESS OF WELDING AND ARTICLE PRODUCED THEREBY

Filed April 25, 1929　　　2 Sheets-Sheet 1

INVENTOR.
BY J. P. Tarbox
ATTORNEY.

March 27, 1934.   J. P. TARBOX   1,952,474
PROCESS OF WELDING AND ARTICLE PRODUCED THEREBY
Filed April 25, 1929   2 Sheets-Sheet 2

INVENTOR.
BY John P. Tarbox
ATTORNEY.

Patented Mar. 27, 1934

1,952,474

UNITED STATES PATENT OFFICE 1,952,474

PROCESS OF WELDING AND ARTICLE PRODUCED THEREBY

John P. Tarbox, Philadelphia, Pa., assignor to Budd Wheel Company, Philadelphia, Pa., a corporation of Pennsylvania Application April 25, 1929, Serial No. 357,981

9 Claims. (Cl. 219—10)

The subject matter of my invention is a sheet metal artillery spoke body for an automobile wheel and the process of welding it. This wheel body and its individual spokes are substantially full sections in the form illustrated, inaccessible for the ordinary means of clamping. So also are there flash welded structures not necessarily mentioned here and whenever the structure is of this character, my invention will have utility in connection therewith. It is conceived also that it has some utility in connection with sections other than closed. This is particularly true when open sections are very small.

The prime object of my invention is to effectually clamp the parts to be welded together to the welding electrodes. Without such effectual clamping as will assure full current carrying capacity of the electrode and proper distribution of that current carrying capacity over the surface of the parts to be welded together, and without such effective pressure of relatively thin metal parts into contact with the welding electrodes, there will result imperfect welds due jointly or severally to the insufficient welding power, improper distribution thereof, and mis-shape or mis-alignment of the parts themselves. My invention aims to avoid all of these difficulties.

According to my method I oppose the approach of the parts to be welded together by an intervened metallic structure subjected to crushing strains, thereby making use of the resistance of the structure to oppression, to develop that degree of pressure and proper distribution of pressure of the parts to be welded into the intermittent contact with the welding electrodes, sufficient to attain full power, proper distribution, accurate shaping and perfect alignment. This structure I prefer to make of sheet metal to be formed symmetrically with respect to the plane of form of symmetry of the welded parts or otherwise to secure proper distribution of crushing strain, and formed further to contact complementally with the parts to be welded together and to the shape of the electrodes in such manner as to effect general and thorough distribution, shaping them in alignment.

The article itself comprises a wheel body substantially closed, even the ends of the spokes being closed, by the flash welding operation and the interior therefore being inaccessible at the welding. The intervened structure under pressure strain is firmly welded to the one part and insulated from the other part. Being welded to the one part and under pressure strain in the completed article, it becomes a permanent part of the structure.

Of the drawings—

Figure 1:
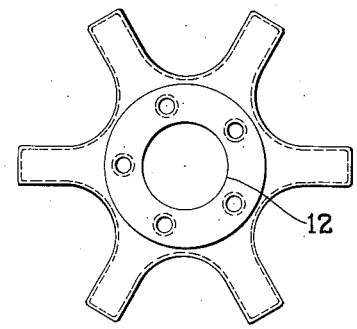
Figure 1 shows in plan on a small scale the completed article.
Figure 2:
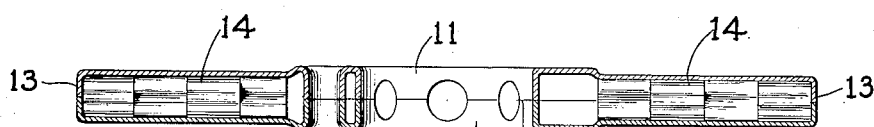
Figure 2 shows in axial cross section on a somewhat larger scale the same article.

The wheel body is comprised in the main of inner and outer complemental stampings 10 and 11 comprehending each a half of the wheel body as divided in the medial plane. Each half is complete with its hub and spoke portions. The inner circle 12 of the hub is closed by meeting flanges. So also the outer ends 13 of the spokes are closed by meeting flanges. Thereafter, the interior of the wheel body is substantially closed and becomes inaccessible to ordinary clamping devices through which the necessary clamping pressure may be developed to hold the work into intermediate and full contact with the electrodes.

According to my invention I oppose the approach of the parts 10 and 11 to each other during the welding operation by an intervened metallic structure 14 of a dimension greater than the space between the parts when the welding is completed, and which thereafter resist the approach of the parts together under the pressure of the electrodes by its crushing strains.

Figure 3:
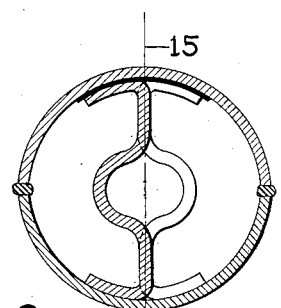
Figures 3 and 4 are transverse spoke sections and are still larger scale drawings showing each of two forms of intervened crushing structure.
Figure 5:
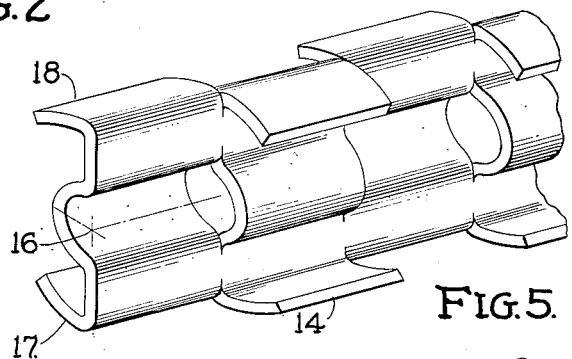
Figures 5 and 6 are perspectives of the crushing structure of Figs. 3 and 4.

This part 14, as shown in Figs. 3 and 5, is of sheet metal the main body of which lies in the plane of symmetry of the spoke 15. The center 16 of the member 14 and its bottom and top 17 and 18 are respectively laterally deflected at intervals in opposite directions. The part 16 is given the form of a bow while the bottom and top parts 17 and 18 are given a curvature complemental to the curvature of the spoke section and of the welding dies.

Figure 4:
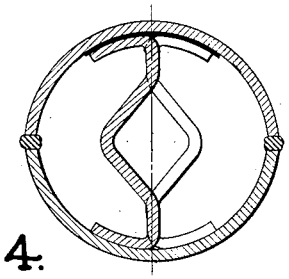
Figure 6:
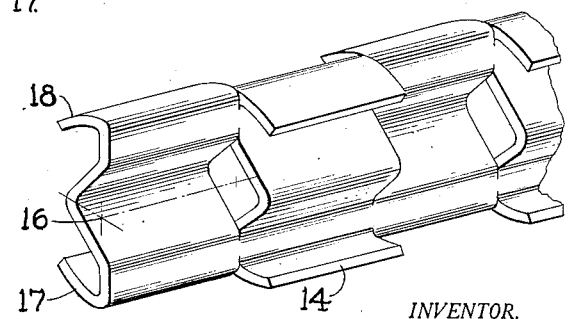

The form of Figs. 4 and 6 differs from the figure of Figure 1 principally in that substantially the entire main body of the member 14 is laterally deflected at intervals alternately to produce a diamond shape cross section. But the general arrangement of the alternately deflected parts is the same.

Figure 7:
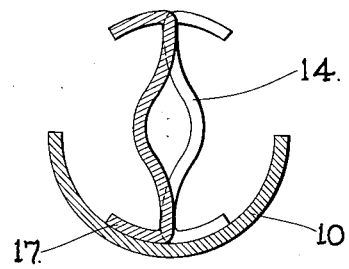
Figures 7, 8 and 9 illustrate several steps of my invention by means of transverse spoke sections and welding dies in various relations.
Figure 8:
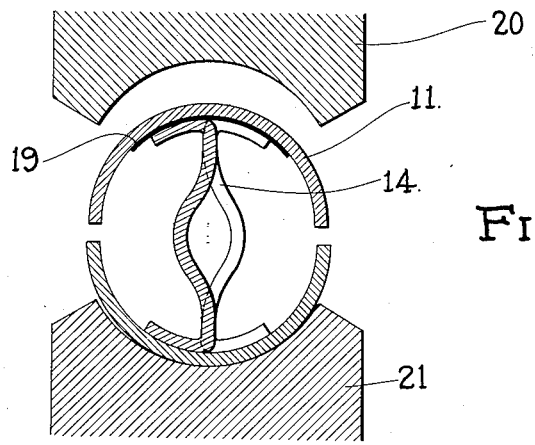
Figure 9:
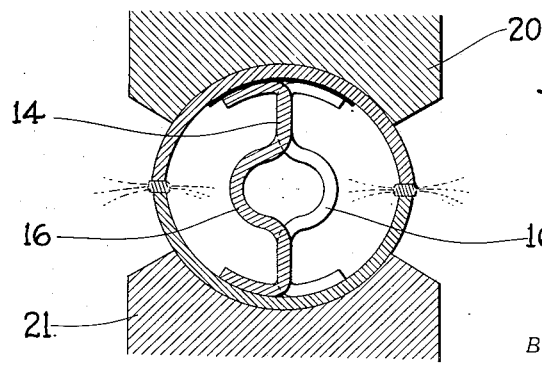

As shown in Fig. 7, I first spot weld the members 14 to the one part 10 of the wheel body, placing the welds in the bottom portions 17. Then as shown in Fig. 8 I place this in the die and insulate the top of member 14 by a strip of material 19 in each spoke. The other part 11 is thereupon laid over the insulating material as shown in Fig. 8. The two welding dies 20 and 21 are then approached toward each other as shown in Fig. 9. By reason of the over-sized dimension of the parts 14 the approach of the parts toward each other is resisted with full crushing strength of the structures 14 and the parts are firmly and snugly clamped against the approaching dies. The crushing strains result in bending of the bowed bodies 16 alternately in symmetry with the plane of symmetry of the respective spokes. As the bending takes place the current is cut off and the final approach of the dies completes the weld. The weld cools and the members 14 are confined under the crushing strains by the welded parts, their bowed centers are permanently distorted. If the elastic limit has been reached in the distortion, the parts have taken a certain set. If it has not been reached while the strain is unrelieved, the distortion is nevertheless none the less permanent. By reason of it and of the permanent securing of the bottom 14 to the one part 10, the structures 14 become permanent mechanical parts of the structure of the wheel body at large. Their strength is added to the strength of the parts themselves, and the wheel body is rendered stronger thereby.

From the foregoing description it will be clear that this construction provides in a flash welded structure having a pair of complemental concave members, a central bracing element which is under a condition of compression and thereby exercises a maximum of efficient bracing force. It will be obvious also that the bracing member because of its peculiar shape, having a lateral deflected portion, is so constructed as to resiliently accept the crushing stress not only during the welding operation but to maintain its resiliency in the completed product, to thus provide a supplemental interior bracing strength augmenting the normal strength of the two welded complemental parts. The feature of having the central laterally extending portions deflected first on one side of the central line and alternately on opposite sides as shown in Figures 5 and 6 tends to balance the direction of the resistance offered by the brace member.

In addition to the remarks relating to the wheel body per se and the general efficacy of the welding method, the article and method of my invention contribute to the general simplification of the welding machines used for these purposes, rendering them far more simple in construction and operation, and considerably less expensive in first cost. Yet further, the achievement of wheel bodies with closed ends renders such bodies absolutely waterproof and at the same time makes it possible for joinder of the wheel bodies with felloes and rims with great neatness and efficiency.

In view of the general adaptability of the invention the annexed claims can but be interpreted in accordance with the breadth of its generic spirit.

What I claim as new and useful and desire to protect by Letters Patent is:

1. The method of flash welding which consists in placing an intervening metallic structure between the parts to be welded, thereafter approaching the parts to be welded together under the resistance to approach of the said intervened metallic structure under mechanical crushing strains, and passing an electric current between said parts during the approach thereof to effect the welding.

2. The method of flash welding parts together which consists in pre-welding to one of them a metallic structure constituting an obstruction to the approach to the other part, insulating the other part from the obstructing structure, approaching the parts together against the resistance of the obstruction, and passing an electric current between said parts during the approach thereof to effect the welding.

3. The method of making artillery type steel wheels from complemental spider members which comprises welding yieldable members to one of said spiders, interposing an insulating medium between the other spider and said yieldable members and flash welding said spider members along a medial plane while simultaneously flexing said yieldable members during the approach motion of the parts.

4. A hollow metallic article comprising a pair of complemental concave members welded to each other along engaging faces, and an intermediate bracing member welded to one of said concave members and abutting the other, said bracing member being held under permanent compression strain between said complemental concave members and thereby reinforcing the same.

5. A vehicle spoke comprising a pair of complemental concave members flash-welded together along abutting edges, and a member welded to one of said complemental members and abutting the other in non-conducting relation, said member being permanently retained under compression between said complemental members and constituting reinforcement of said spoke.

6. A metallic sheet metal spider comprising an integral hollow structure including a central body portion and a plurality of hollow substantially radially extending projections, and a metallic member welded to the inner part of one side of said hollow metallic structure and in abutting insulated relation to the other side, said member being retained under compression between the sides of said hollow member and constituting a permanent resilient internal reinforcement.

7. A flash welded structure comprising a pair of complemental concave members welded to each other along engaging faces, and an interior bracing member having a first portion welded to one of said concave members and the second portion abutting the other of said concave members, said bracing member being under compression between said complemental members and having an intermediate portion between said first and second portions laterally extended from its immediate adjacent portions.

8. A flash welded structure comprising a pair of complemental concave members welded to each other along engaging faces, and an interior bracing member having a first portion welded to one of said concave members and the second portion abutting the other of said concave members, said bracing member being under compression between said complemental members and extending from one complemental member first substantially centrally, thence laterally, thence returned centrally, and thence toward the opposite complemental member.

9. A flash welded structure comprising a pair of complemental concave members welded to each other along engaging faces, and an interior bracing member having a first portion welded to one of said concave members and the second portion abutting the other of said concave members, said bracing member being under compression between said complemental members and having an intermediate portion between said first and second portions laterally extended from its immediate adjacent portions, said bracing member being constituted of a plurality of such laterally extended portions alternately deflected toward opposite sides thereof.

JOHN P. TARBOX.